(12) United States Patent
Babjak

(10) Patent No.: US 7,823,577 B1
(45) Date of Patent: Nov. 2, 2010

(54) GRILL AND GRILL CAROUSEL FOR USE THEREWITH

(76) Inventor: James Babjak, 15796 W. Eucalyptus Ct., Surprise, AZ (US) 85374

( * ) Notice: Subject to any disclaimer, the term of this patent is extended or adjusted under 35 U.S.C. 154(b) by 170 days.

(21) Appl. No.: 12/264,766

(22) Filed: Nov. 4, 2008

Related U.S. Application Data (60) Provisional application No. 61/001,765, filed on Nov. 5, 2007.

(51) Int. Cl.
*A47J 37/07* (2006.01)
*A47J 37/04* (2006.01)
*A21B 1/44* (2006.01)

(52) U.S. Cl. .................. 126/25 AA; 126/25 R; 126/41 R; 99/423

(58) Field of Classification Search ........... 126/41 R, 126/25 AA, 25 R; 99/423
See application file for complete search history.

(56) References Cited

U.S. PATENT DOCUMENTS

| | | | | |
|---|---|---|---|---|
| 2,168,773 A | * | 8/1939 | Parr | 99/423 |
| 2,438,699 A | * | 3/1948 | Groetchen | 99/423 |
| 2,915,959 A | * | 12/1959 | Stott | 99/345 |
| 2,920,177 A | * | 1/1960 | Brane | 99/391 |
| 3,131,685 A | * | 5/1964 | Bergfield | 126/25 AA |
| 4,683,866 A | * | 8/1987 | Bales et al. | 126/258 |
| 4,732,138 A | * | 3/1988 | Vos | 126/25 A |
| 5,964,212 A | * | 10/1999 | Thompson | 126/25 R |
| 5,983,882 A | * | 11/1999 | Ceravolo | 126/25 R |
| 6,802,247 B1 | * | 10/2004 | Lee | 99/339 |
| 6,929,001 B2 | * | 8/2005 | Yoon | 126/25 AA |

* cited by examiner

*Primary Examiner*—Kenneth B Rinehart
*Assistant Examiner*—Frances Kamps
(74) *Attorney, Agent, or Firm*—Parsons & Goltry; Michael W. Goltry; Robert A. Parsons (57) ABSTRACT

A grill assembly includes a flat, broad first grill having a first upper grill face to receive food to be cooked and an opposed lower grill face, and a flat, broad second grill having a second upper grill face to receive food to be cooked, and an opposed second lower grill face. The second grill is positioned atop the first upper grill face of the first grill juxtaposing the second lower grill face of the second grill opposite to the first upper grill face of the first grill. A coupling is formed between the first grill and the second grill to allow rotation of the second grill relative to the first grill.

22 Claims, 7 Drawing Sheets

GRILL AND GRILL CAROUSEL FOR USE THEREWITH

FIELD OF THE INVENTION

The present invention relates to grills used in grilling and cooking food and, more particularly, to accessories for use with grills used in grilling and cooking food.

BACKGROUND OF THE INVENTION

A grill is a cooking utensil of parallel bars on which food is exposed to heat. A grill is suspended above a heat source underlying the grill, such as one or more electric burners, burning charcoal, burning wood, burning gas emitting from one or more gas burners, or other selected heat source. Food is then placed onto the grill and cooked, which often involves periodically turning the food and adjusting the food relative to the designated heat source to ensure even cooking.

Grills are employed in stovetop installations, and in portable gas and charcoal grill installations. Gas or gas-fueled grills use propane or natural gas as the fuel source. Gas grills are available in sizes ranging from small, single steak grills up to large, industrial sized restaurant grills that are able to cook enough meat to feed up to a hundred or more people. A common consumer variety of gas grill is the cart gas grill, which includes a wheeled cart that supports a grill above gas burners and that holds a fuel tank. Wheeled carts in such gas grills often have side tables and other convenient features. Charcoal grills use either charcoal briquettes or lump coal as a fuel source, which, when burned, transform into hot embers that radiate the heat to the grill suspended over or near the hot embers. Like gas grills, charcoal grills are available in sizes ranging from small, single steak grills up to large, industrial sized restaurant grills that are able to cook enough meat to feed up to a hundred or more people. A common consumer variety of charcoal grill is the kettle charcoal grill, which includes a wheeled kettle that supports a grill above a lower chamber used to hold burning charcoal. Wheeled carts in such gas grills often have side tables and other convenient features.

Grilling food over grills heated with either gas or charcoal is a very popular way of cooking because grilling imparts a tremendous amount of flavor to the food. However, grilling food well is often tricky business because the heat source underlying the grill often applies irregular heat across the grill creating hot spots and cold spots on the grill. As such, grilling food well normally involves having to repeatedly move and turn the food on the grill to ensure even cooking and that the food is cooked well or otherwise to a desired degree of doneness. Accordingly, what is needed in the art is way to overcome the problem provided by hot and cold spots on a grill caused by application of the grill to an uneven heat source.

SUMMARY OF THE INVENTION

Accordingly, there is a need in the art for an improved grill and grill utensil useful in evenly grilling and cooking food over an uneven heat source to ensure even and efficient grilling and cooking of food and that conveys the food along a conveyance path relative to an uneven heat source.

According to the principle of the invention, a grill assembly includes a flat, broad first grill having a first upper grill face to receive food to be cooked and an opposed lower grill face, and a flat, broad second grill having a second upper grill face to receive food to be cooked, and an opposed second lower grill face. The second grill is positioned atop the first upper grill face of the first grill juxtaposing the second lower grill face of the second grill opposite to the first upper grill face of the first grill. A coupling is formed between the first grill and the second grill to allow rotation of the second grill relative to the first grill. The first upper grill face of the first grill defines a first grilling area, the second upper grill face of the second grill defines a second grilling area, and the first grilling area of the first upper grill face of the first grill is greater than the second grilling area of the second upper grill face of the second grill. The second grill has an outer perimeter, and a plurality of protuberances is formed at spaced intervals along the outer perimeter of the second grill extending upright relative to the second upper grill face of the second grill. The perimeter is formed with opposed handles projecting upright relative to the second upper grill face of the second grill, which are used to take up the second grill. The coupling formed between the first grill and the second grill to allow rotation of the second grill relative to the first grill includes a foot received against the first upper grill face of the first grill and mounted to the second grill for rotation to allow rotation of the second grill relative to the first grill. The foot is formed with at least one leg interacting with the first grill preventing the foot from rotating relative to the first grill in response to rotation of the second grill. The second grill has a geometric center, and the foot is formed proximate to the geometric center of the second grill. In a particular embodiment, the grill assembly is carried by a grill box formed with a wheeled cart.

According to the principle of the invention, a grill assembly includes a flat, broad first grill having a first upper grill face to receive food to be cooked and an opposed lower grill face, and a flat, broad second grill having a second upper grill face to receive food to be cooked, and an opposed second lower grill face. The second grill is positioned atop the first upper grill face of the first grill juxtaposing the second lower grill face of the second grill opposite to the first upper grill face of the first grill. A coupling is formed between the first grill and the second grill to allow rotation of the second grill relative to the first grill, and a wheel is mounted for rotation adjacent to the second grill. The wheel is operatively coupled to the second grill rotating the second grill in response to rotation of the wheel. In a particular embodiment, a motor is operatively coupled to the wheel to impart rotation to the wheel. In another embodiment, a handle is operatively coupled to the wheel to impart rotation to the wheel in response to rotation of the handle. The second grill further including an outer perimeter. A first plurality of protuberances is formed at spaced intervals along the outer perimeter of the second grill, and a second plurality of protuberances is carried by the wheel interacting with the first plurality of protuberances operatively coupling the wheel to the second grill. The first upper grill face of the first grill defines a first grilling area, the second upper grill face of the second grill defines a second grilling area, and the first grilling area of the first upper grill face of the first grill is greater than the second grilling area of the second upper grill face of the second grill. The outer perimeter of the second grill is formed with opposed handles projecting upright relative to the second upper grill face of the second grill, which are used to take up the second grill. The coupling formed between the first grill and the second grill to allow rotation of the second grill relative to the first grill includes a foot received against the first upper grill face of the first grill mounted to the second grill for rotation to allow rotation of the second grill relative to the first grill. The foot is formed with at least one leg interacting with the first grill preventing the foot from rotating relative to the first grill in response to rotation of the second grill. The second grill has a geometric center, and the foot is formed proximate to the geometric center of the second grill. In a particular embodiment, the grill assembly and the wheel are carried by a grill box formed with a wheeled cart.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION OF PREFERRED EMBODIMENTS

Figure 1:
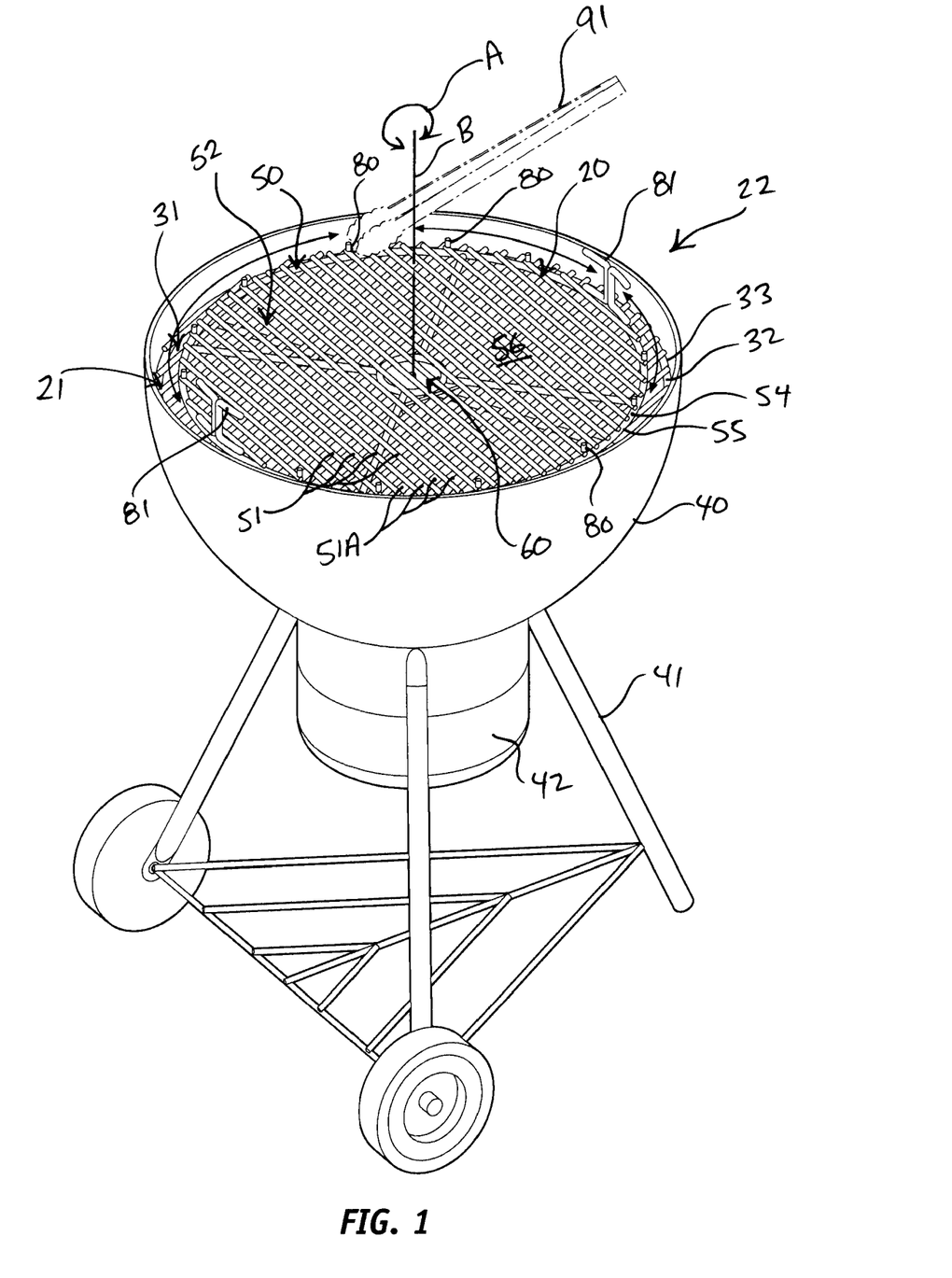
FIG. 1 is a perspective view of a grill carousel installed with a grill forming a grill assembly constructed and arranged in accordance with the principle of the invention.

Turning now to the drawings, in which like reference characters indicate corresponding elements throughout the several views, attention is first directed to FIG. 1 in which there is seen a perspective view of a grill carousel 20 installed with a grill 21 forming a grill assembly 22 constructed and arranged in accordance with the principle of the invention. Referencing FIG. 2, which is a perspective view of the grill carousel of FIG. 1 shown as it would appear removed from grill 21 and located above grill 21 as illustrated, grill 21 is formed of stainless steel or other like or similar heat resistant material or combination of materials suitable for use in grilling and cooking food, and is a flat, broad cooking utensil formed of equally spaced-apart parallel bars 30 on which food is exposed to heat. Bars 30 are separated by parallel gaps 30A, and in this example bars 30 are cut to lengths forming grill 21 as a broad, flat circular utensil. The upper surfaces of bars 30 together define an upper grill face 31 of grill 21, on which food is normally placed for grilling. The free ends of bars 30 are rigidly affixed, such as by welding, to a circular ring 32, forming an outer perimeter 33 of grill 21. Upper grill face 31 defines a grilling area of grill 21 denoted generally at 35 in FIG. 2. Although grill 21 is circular in the present example, it may be formed in other shapes, such as rectangular, square, or other selected shape.

Figure 2:
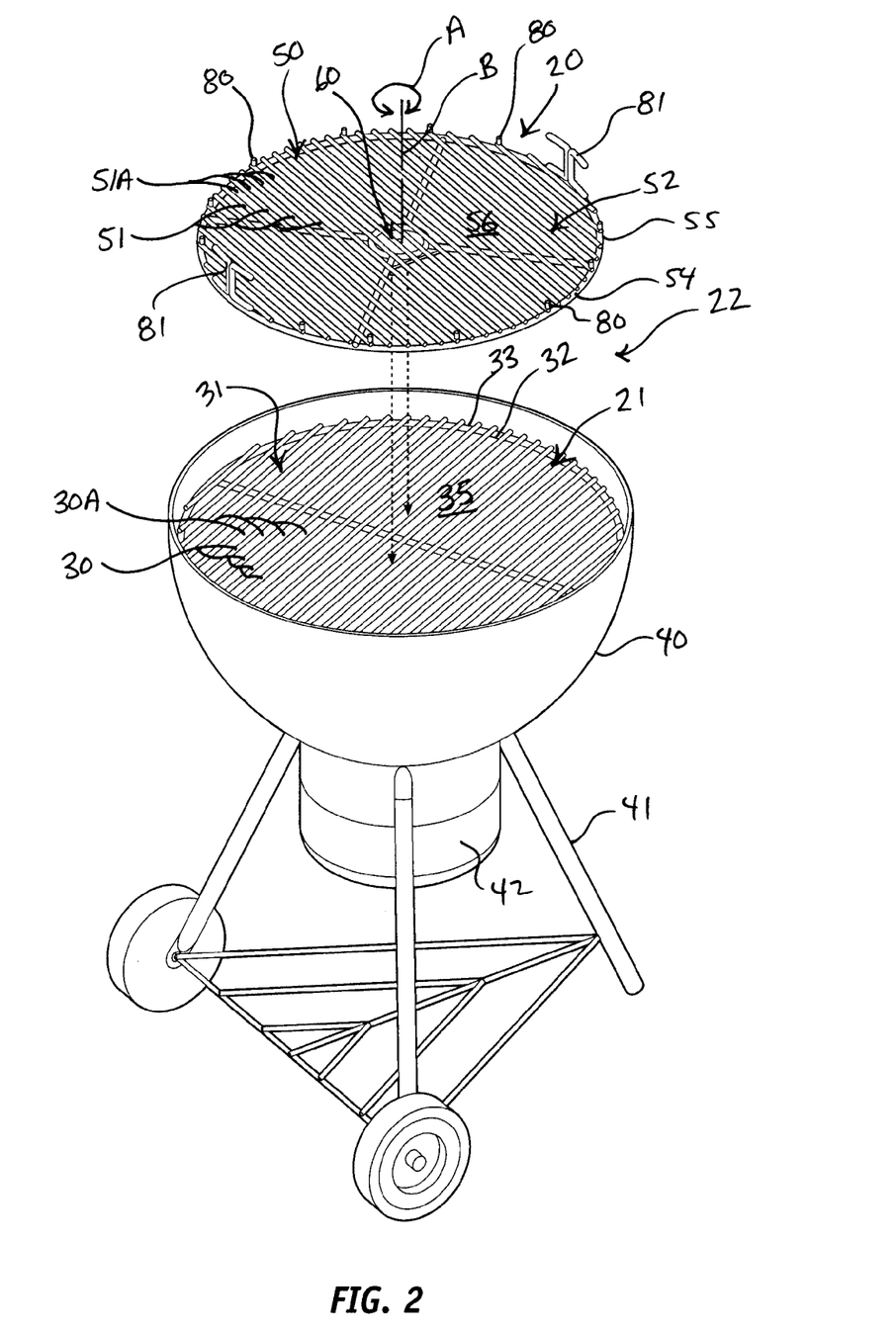
FIG. 2 is a perspective view of the grill carousel of FIG. 1 shown as it would appear removed from the grill.

Grill 21 is supported horizontally by a kettle or grill box 40. In this example, grill box 40 is formed in a wheeled cart 41, which supports grill box 40 at an elevated location. Grill box 40 is used to hold and maintain a heat source under grill 21 to apply heat to grill 21 for cooking/grilling food placed on upper grill face 31 of grill 21, such as steaks, pork chops, chicken pieces, fish pieces, sausages, vegetables, etc. In this example, grill box 40, which is fashioned conventionally of steel, is formed with a firebox denoted at 42, which used to hold lighted charcoal as the heat source under grill 21. In other examples, grill box 40 may be configured maintain heat under grill 21 from lighted gas, such as propane or natural gas, applied to one or more gas burners formed in grill box 40 from a gas tank associated with grill box 40 and coupled in gaseous communication to the one or more gas burners formed in grill box.

The combination of grill 21 and grill box 40 is exemplary of a conventional barbecue grill, further details of which will readily occur to those having ordinary skill and will not be discussed in further detail except to the extent necessary to make an enabling disclosure of the invention. In the present example, grill 21 and grill box 40 are formed with cart 41 forming a conventional portable barbecue grill. If desired, grill 21 and grill box 40 may be formed in a permanent indoor or outdoor installation.

Figure 3:
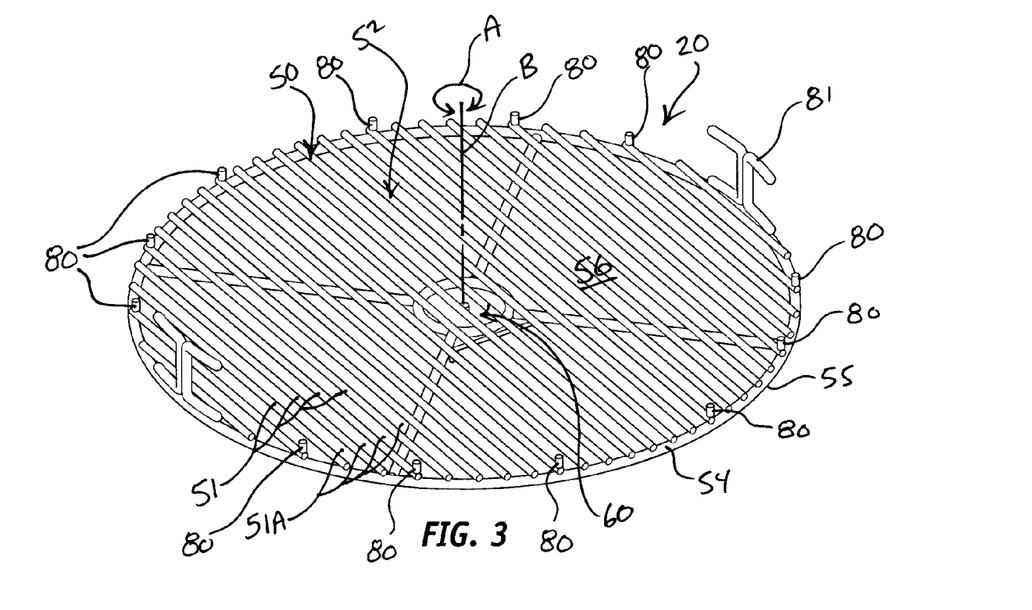
FIG. 3 is a top perspective view of the grill carousel of FIG. 1.

Referencing FIGS. 1-3, grill carousel 20 is formed of stainless steel or other like or similar material or combination of materials, and includes a grill 50, which is a flat, broad cooking utensil formed of equally spaced-apart parallel bars 51 on which food is exposed to heat. Bars 51 are separated by gaps 51A, and in this example bars 50 are cut to lengths forming grill 50 as a broad, flat circular utensil. The upper surfaces of bars 51 together define an upper grill face 52 of grill 50, and the opposed lower surfaces of bars 51 together form a lower grill face 53 of grill 50, as illustrated in FIG. 3, opposing and parallel relative to upper grill face 52. The free ends of bars 51 are rigidly affixed, such as by welding, to a circular ring 54, forming an outer perimeter 55 of grill 50. Upper grill face 52 defines a grilling area of grill 50 denoted generally at 56 in FIGS. 1-3. Although grill 50 is circular in the present example, it may be formed in other shapes, such as rectangular, square, or other selected shape. Overall, grill 50 is somewhat smaller than grill 21, in which grilling area 35 of grill 21 is greater in size and area than the size and area of grilling area 56 of grill 50 of grill carousel 20.

Figure 4:
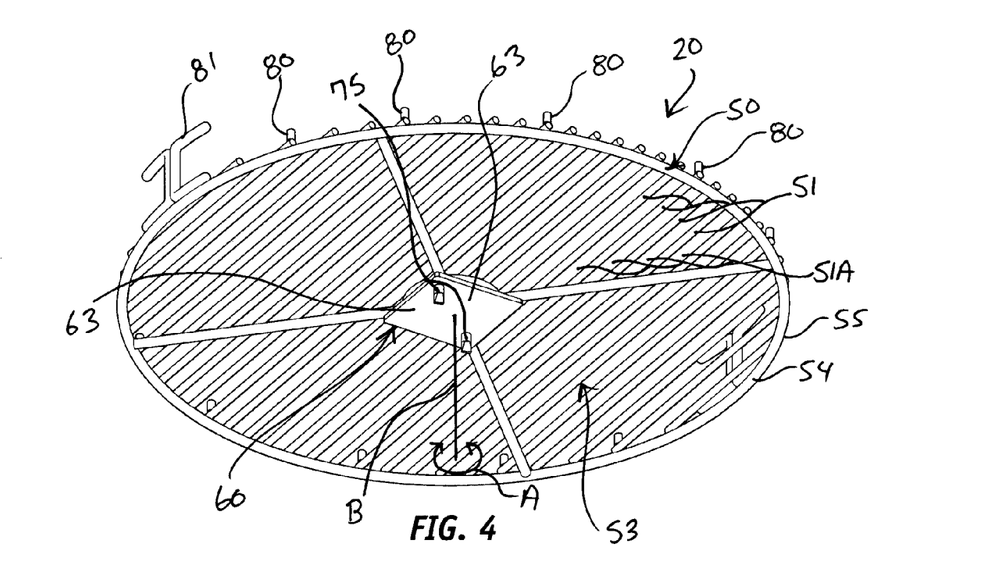
FIG. 4 is a bottom perspective view of the grill carousel of FIG. 1.
Figure 5:
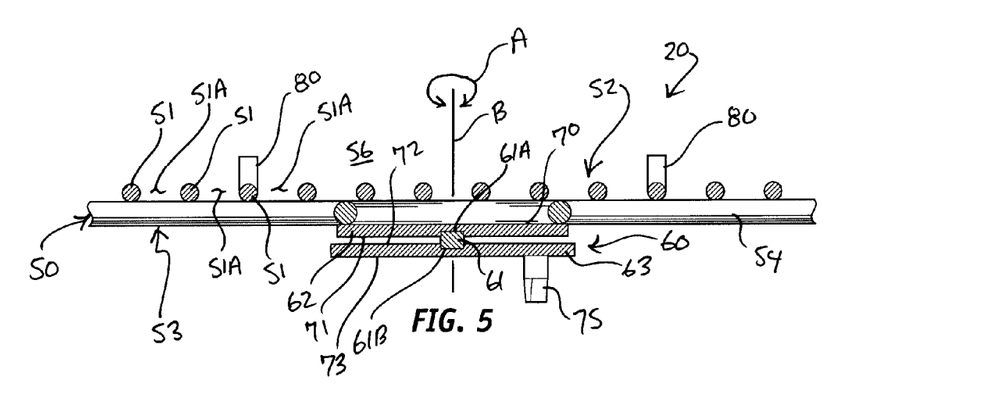
FIG. 5 is a sectional view taken along line 5-5 of FIG. 3.

Referencing FIGS. 4 and 5, grill 50 rotates in clockwise and counterclockwise directions as indicated by the double arrowed line A at a coupling denoted at 60 about an axis of rotation B. Coupling 60 is a rotational coupling or turntable coupling, and is formed at the geometric center of grill 50, whereby axis of rotation B is a central axis of rotation of grill 50 about which grill 50 rotates and is symmetrical. The combination of grill 50 and coupling 60 form grill carousel 20, and coupling 60 is presented onto grill 21 in use to form grill assembly 20 in FIG. 1 and allows for the rotation of grill 50 about axis of rotation B in the cooking of food, in accordance with the principle of the invention and which is discussed in further detail below.

Coupling 60, which is a rotating or rotational coupling as explained above about which grill 50 rotates, consists of a pin 61 interconnecting a base 62 rigidly affixed to grill 50 to an opposed foot 63. In the present embodiment, base 32 is a relatively small, flat, circular disk, and foot 63 is a relatively small, flat, square plate, and different shapes and configurations may be employed of desired without departing from the invention.

Base 62 is rigidly affixed to lower grill face 53 of grill 50. More particularly, base 62 is rigidly affixed to the lower surfaces bars 51 at lower grill face 53 of grill 50, such as by welding, or with one or more clamps, or the like. Base 62 is located at the geometric center of grill 50, may be considered part of grill 50, and is sufficiently small such that it does not impede heat from passing through to grill 50. Pin 61 connects base 62 to foot 63. Pin 61 has an upper end 61A journaled to base 62, and an opposed lower end 61B rigidly affixed, such as by welding or by integrally forming lower end 61B with foot 63, to foot 63, and this can be reversed, if desired. Foot 63 opposes and is spaced apart from base 62, and is held away from lower grill face 53 as best illustrated in FIG. 5, which holds grill 50 above a surface onto which foot 63 is placed to allow grill 50 to free rotate about axis of rotation B without impairment. The journaled attachment of upper end 61A of pin 61 to base 62 permits rotation of grill 50 and base 62 at pin 61 about axis of rotation B relative to foot 63.

Figure 6:
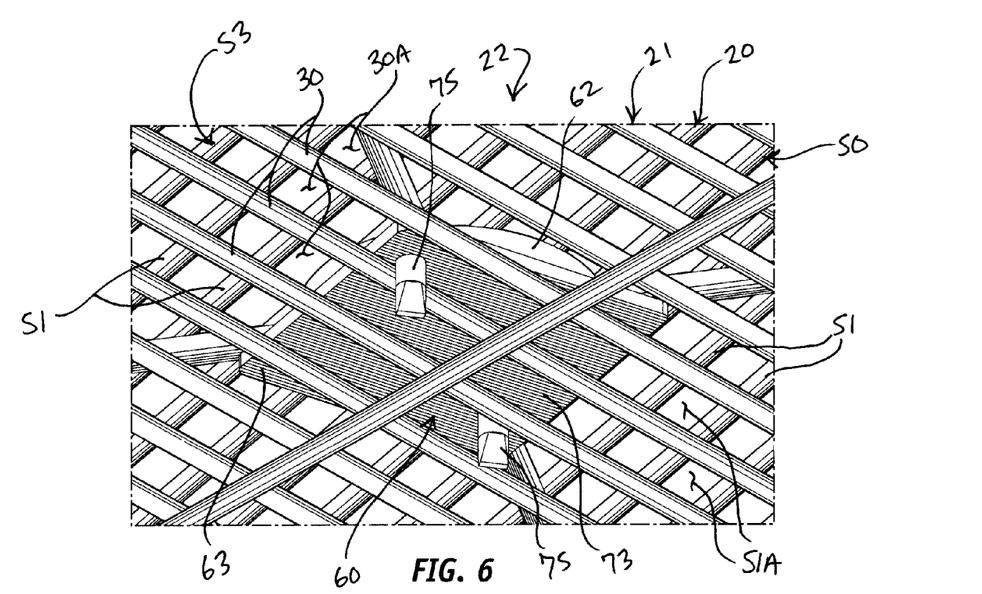
FIG. 6 is an enlarged, fragmented perspective view of a coupling of the grill carousel of FIG. 1 shown as it would appear installed onto the grill of FIG. 1.

For the purposes of orientation and reference with regard to FIG. 5, base 62 has an upper surface 70 facing lower grill face 53 of grill 50, and an opposed lower surface 71. Foot 63 has an upper surface 72 facing lower surface 71 of base 62, and an opposed lower surface 73. As best seen in FIGS. 4 and 6, opposed, spaced-apart legs 75 are formed on lower surface 73 of foot 63. Legs 75 are substantially equal in size and shape and are rigidly affixed to lower surface 73 of foot 63, such as by welding or by integrally forming legs 75 with foot 63, and project outwardly or otherwise downwardly away from lower surface 73 of foot 63. In the present embodiment, foot 63 is formed with two legs 75, and less or more can be used consistent with the teachings of the present invention.

Referencing FIG. 3, grill 50 is formed with a plurality of protuberances 80, and opposed handles 81. Protuberances 80 are used to assist a user in rotating grill 50 in the cooking of food, and handles 81 are used to take up grill 50 by hand. Protuberances 80 are formed at spaced intervals along outer perimeter 55 of grill 50 and encircle grill 50 at outer perimeter 55, and extend upright relative to upper grill face 52 of grill 50. In the present embodiment, protuberances 80 are substantially equal in size and shape, and are each rigidly affixed, such as by welding, to a free end of one of bars 51 at outer perimeter 55. If desired, protuberances 80 can be formed on ring 54 at outer perimeter 55 without departing from the invention. Handles 81 oppose each other and are formed at outer perimeter 55 on either side of grill 50. In this preferred embodiment, handles 81 are rigidly affixed to ring 54, such as by welding, and project upright relative to upper grill face 52 and are available to be taken up by hand to carry grill carousel 20.

Grill carousel 20 is used in conjunction with grill 21 and functions is a food conveyance for moving food in a circular path relative to grill 21 to ensure even exposure to the heat source applied beneath grill 21 to provide even cooking of the food applied to grill 50 of grill carousel 20. To install grill carousel 20 with grill 21 to form grill assembly 22, grill carousel 20, consisting of grill 50 and coupling 60, is taken up and lowered onto upper grill face 31 at the center of grilling area 35 (grilling area 35 of grill 21 denoted only in FIG. 2) applying lower grill face 53 supporting coupling 60 to upper grill face 31 of grill 21 as illustrated in FIG. 1 and directing lower surface 73 of foot 63 onto the upper surfaces of bars 30 forming upper grill face 31 of grill 21 and directing legs 75 into and through corresponding gaps 30A between bars 30 as illustrated in FIG. 6. As explained above, grill 50 is smaller in size than grill 21, and properly installed in accordance with the principle of the invention is positioned substantially at the center of grilling area 35, as substantially illustrated in FIG. 1, so as to be located within the boundary of grilling area 35 over a heat source maintained by grill box 40 under grill 21.

Having formed grill assembly 22, grill carousel 20 may be used to cook food, such as steaks, chicken, fish, vegetables, etc. Before cooking food with grill assembly 22, a heat source is first formed under grill 21, and this is done conventionally either with forming a mass of lighted charcoal in grill box 40 beneath grill 21, or forming lighted gas from one or more gas burners in grill box 40 beneath grill 21. After a suitable heat source has been formed in grill box 40 beneath grill 21, the heat passes through gaps 30A in grill 21 to grill 50 of grill carousel 20 heating grill 50. After preheating grill 50 to a predetermined temperature or for a predetermined duration of time, food may then be cooked or grilled on grill 50 by placing the food to be grilled onto upper grill face 52 of grilling area 56 of grill 50 around axis of rotation B at the geometric center of grill 50 between axis of rotation B and outer perimeter 55. Again, the food placed on upper grill face 52 can be steaks, chicken pieces, ribs, vegetables, etc. With food so applied or otherwise placed on upper grill face 52 of grill 50 and with the heat source maintained in grill box 40 underneath grill 21, grill 50 is manually rotated 10-15 degrees, or other selected degree of rotation, every 5 to 10 seconds, or other selected time interval, to periodically adjust the position of the food on grill 50 relative to the heat source maintained in grill box 40 under grill 20 to provide even application of heat to the food cooking on upper grill face 52 of grill 50 until the food has reached a desired degree of doneness, in accordance with the principle of the invention. At one or more intervals during the cooking time, it may be beneficial to turn the food over to further ensure the food is cooked to a desired degree of doneness in conjunction with periodically rotating grill 50 to ensure even application of heat to the food, in accordance with the principle of the invention. Rather than periodically rotating grill 50 during the cooking time, grill 50 may be constantly rotated, if desired. Grill 50 may be rotated in a clockwise direction, or a counterclockwise direction.

Manually rotating grill 50 of grill carousel 20 is preferably done by taking up an implement, such as a long skewer, a fork, or tongs 90 illustrated in dotted outline in FIG. 1, applying a working end of such an implement against a protuberance 80, and applying a force to the selected protuberance 80 with the implement to impart rotation to grill 50. This is the preferred way of rotating grill 50 according to the present embodiment, because to do so by hand could result in the user's hand becoming burned when brought in contact, or close contact, with grill 50. After the food is cooked to a desired degree of doneness, the food is simply removed from grill 50, such as with tongs.

As previously mentioned, handles 81 projecting upwardly relative to upper grill face 52 on either side of grill 50 are used to hold and maneuver grill 50. Accordingly, after food on grill 50 is cooked to a desired degree of doneness, handles 81 may be taken up, such as by hand, and grill carousel 20 pulled away from grill 21 and taken to the table or to the kitchen for service of the grilled and cooked food. Handles 81 may tend to get hot in response to exposure of grill 50 to heat from the heat source maintained by grill box 40. As such, hands should be protected in taking up handles 81, such as with oven mitts or head pads or the like.

The presentation of legs 75 in gaps 30A formed between the respective opposed bars 51 of grill 50 illustrated in FIG. 6 in the proper installation of grill carousel 20 on grill 21 allows legs 75 to interact with the respective bars 51 to prevent foot 63 from rotating in response to rotation of grill 50, in accordance with the principle of the invention, and to ensure grill 50 easily rotates relative to foot 63.

Rotation of grill 50 is carried out manually as explained above. If desired, a motorized system may be employed to impart rotation to a grill of a grill carousel constructed and arranged in accordance with the principle of the invention in the grilling and cooking of food. To illustrate this aspect of the invention, attention is now directed to FIG. 7, which is a perspective view of a grill carousel 100 shown installed with grill 21 forming a grill assembly 102 constructed and arranged in accordance with the principle of the invention, and a wheel 103 operatively coupled to grill carousel 100 rotating grill carousel 100 relative to grill 21. In common with the previously described embodiment, grill 21 is carried by grill box 40 formed with firebox 42 and which is carried by cart 41. In common with the previously described embodiment of grill carousel 20 as illustrated in relevant part in FIGS. 8 and 9, grill carousel 100 shares grill 50, bars 51, gaps 51A, upper grill face 52, lower grill face 53, ring 54, perimeter 55, grilling area 56, coupling including pin 61, base 62, and foot 63 including legs 75, and protuberances 80, and handles 81. Grill carousel 100 is installed with grill 21 in precisely the same manner as grill carousel 20 is installed with grill 21 as discussed in the previous embodiment, and it is to be understood that the foregoing discussion of the installation of grill carousel 20 with grill 21 and the provision of rotating grill 21 in the grilling and cooking of food applies in every respect to grill carousel 100.

Figure 8:
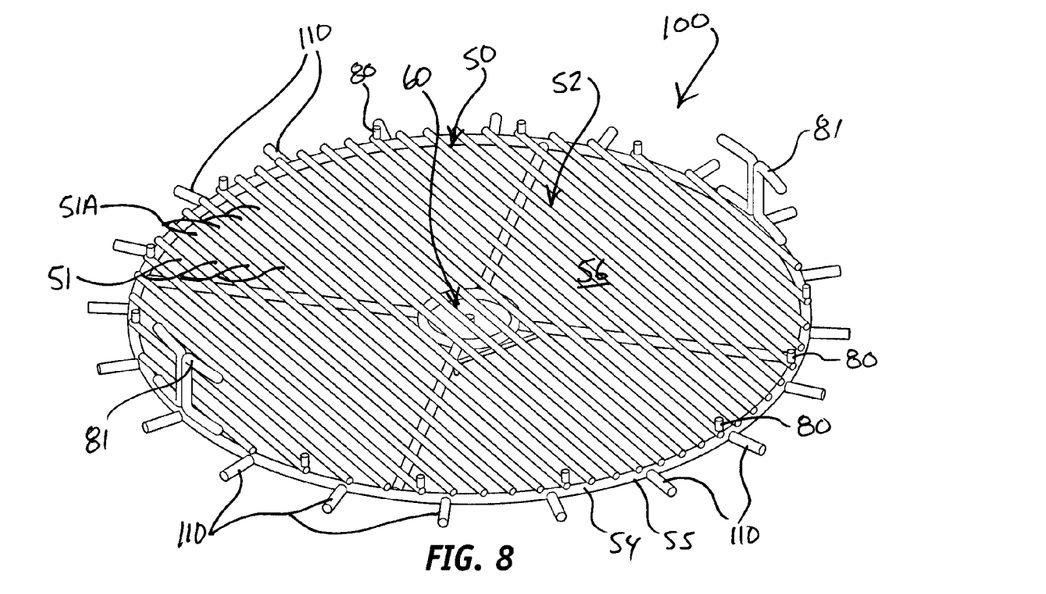
FIG. 8 is a top perspective view of the grill carousel of FIG. 7.
Figure 9:
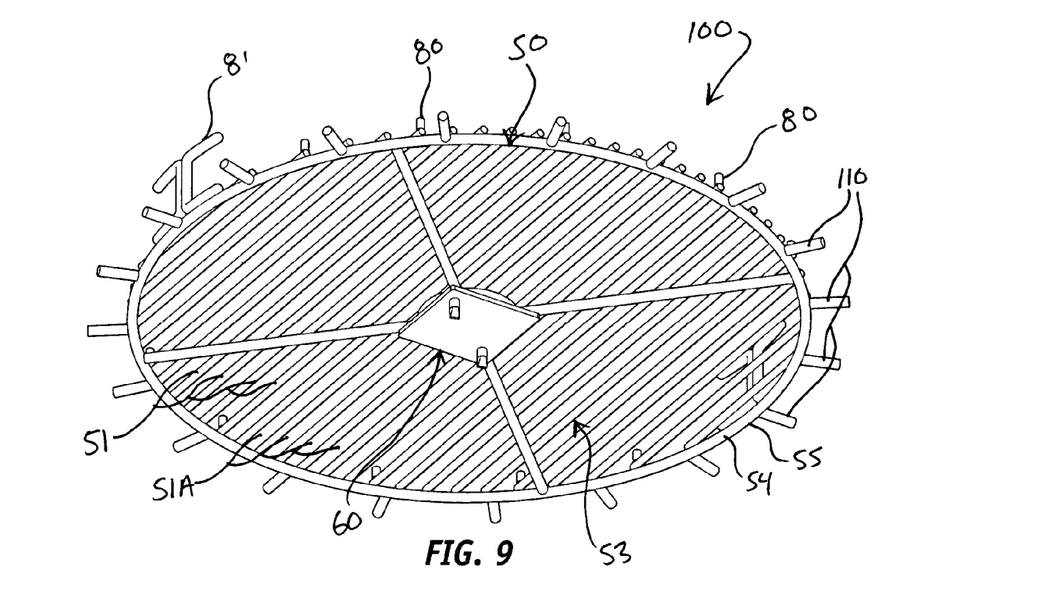
FIG. 9 is a bottom perspective view of the grill carousel of FIG. 7.

Referencing FIGS. 8 and 9, in addition to protuberances 80 grill 50 is formed with another plurality of protuberances 110. Protuberances 110 are formed at spaced intervals along outer perimeter 55 of grill 50 and encircle grill 50 at outer perimeter 55, and, in this embodiment, extend laterally outwardly from outer perimeter 55 diverging laterally outward from outer perimeter 55. In the present embodiment, protuberances 110 are substantially equal in size and shape, and are each rigidly affixed, such as by welding, to ring 54 at outer perimeter 55. If desired, protuberances 110 may be integrally formed with ring 54. The provision of protuberances 100 is the only difference between grill carousel 100 and grill carousel 20 discussed above.

Figure 7:
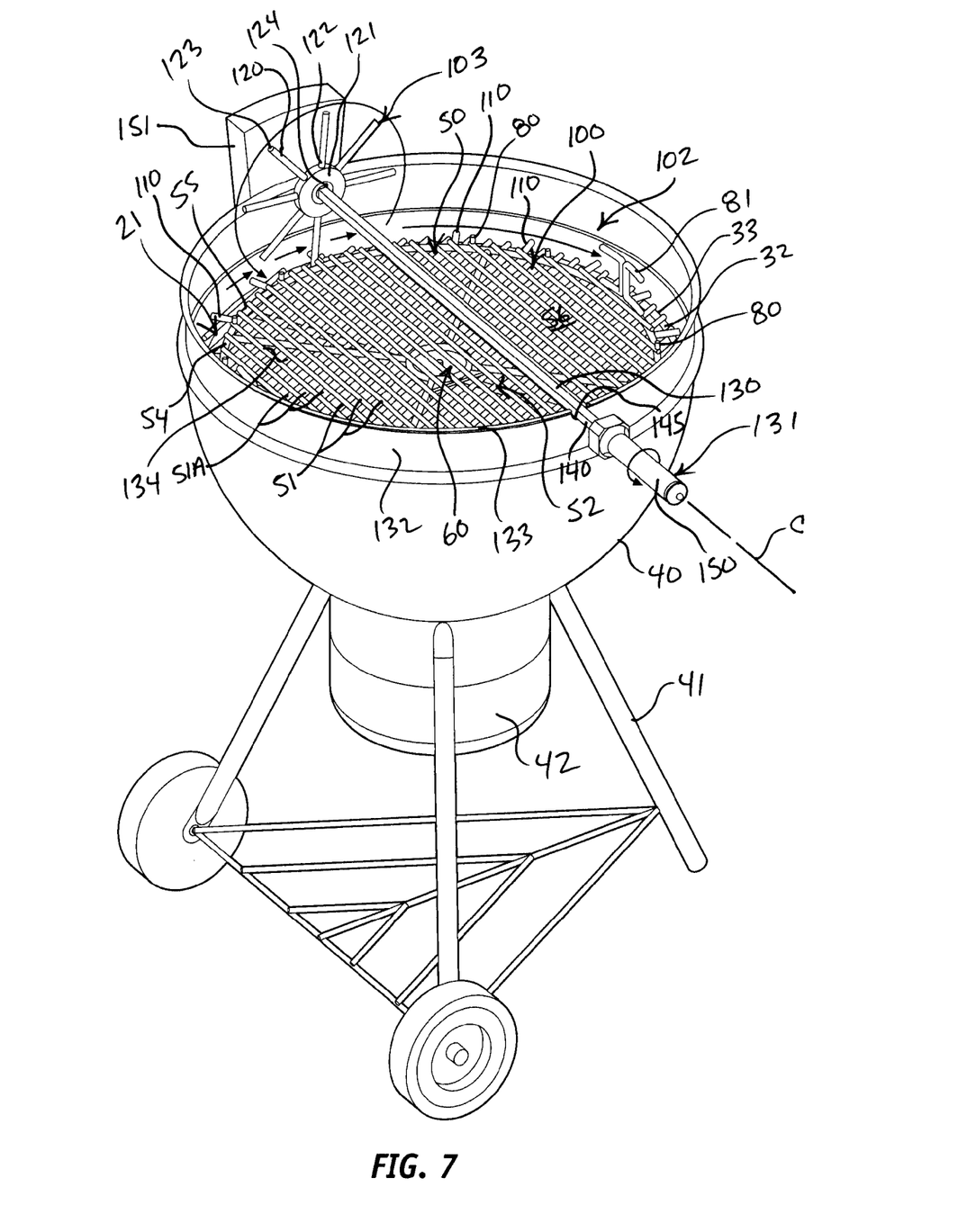
FIG. 7 a perspective view of a grill carousel installed with a grill forming a grill assembly constructed and arranged in accordance with the principle of the invention, and a wheel operatively coupled to the grill carousel useful in rotating the grill carousel relative to the grill.
Figure 10:
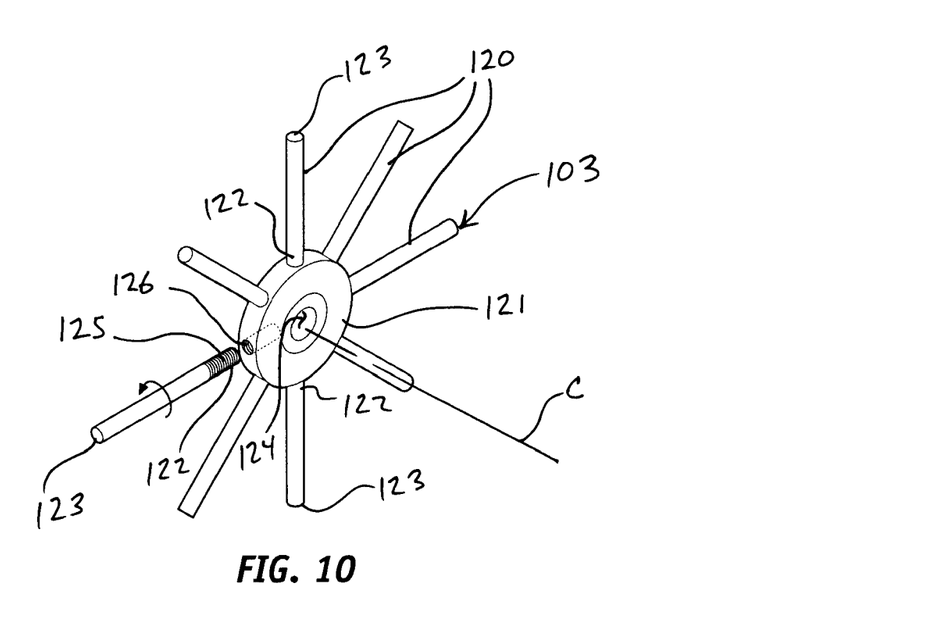
FIG. 10 is a perspective view of the wheel of FIG. 7 including a group of spokes attach to and diverging outwardly from a hub in a circumferential array, in which one of the fingers is shown detached from the hub for illustrative purposes.
Figure 11:
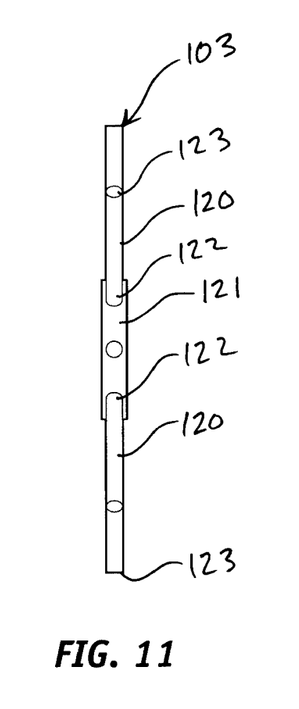
FIG. 11 is a side elevation view of the wheel of FIG. 7.
Figure 12:
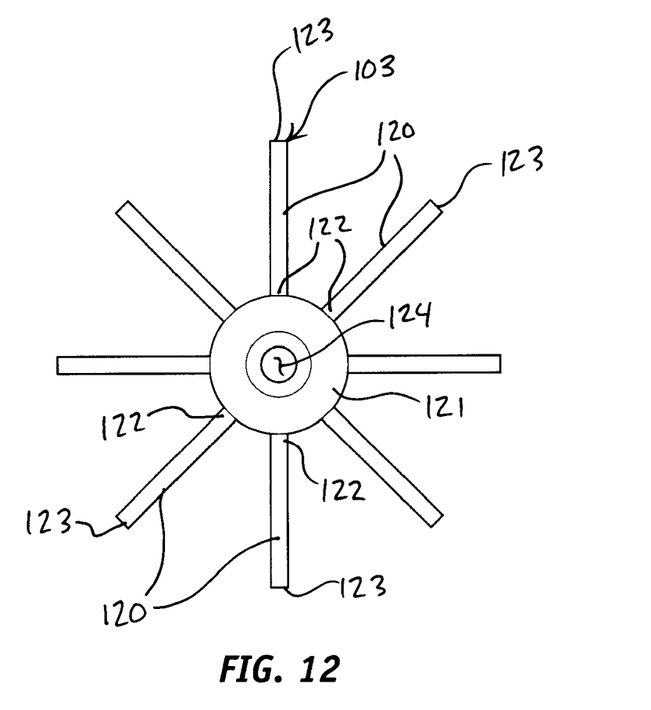
FIG. 12 is a front elevation view of the wheel of FIG. 7.

Referencing FIGS. 10 and 12, wheel 103 consists of spokes 120 attached to and diverging radially outward from a hub 121 in a circumferential arrangement about hub 121. Each spoke 120 has an inner end 122 rigidly affixed to hub 121 and extends outwardly from hub 121 to an opposed outer end 123. Inner ends 122 are each rigidly affixed to hub 121 with an engagement assembly, which, in this particular example, consists of an outwardly threaded portion 125 formed in inner end 122 of spoke 120, and a corresponding inwardly threaded portion or socket 126 formed in hub 121, as illustrated in FIG. 10. Other suitable or selected engagement pairs may be used to secure spokes 120 to hub 121. In other embodiments, inner ends 122 of spokes 120 may be welded to hub 121, integrally formed with hub 121, pinned to hub 121, etc. Outer ends 123 of spokes 120 are considered protuberances of wheel 103. A central opening 124 is formed in hub 121, and defines an axis of rotation C of wheel as illustrated in FIG. 10. For illustrative purposes, FIG. 11 is a side elevation view of wheel 103. In use, wheel 103 is mounted for rotation adjacent to grill 50 of grill carousel 100 as illustrated in FIG. 7, and is operatively coupled to grill 50 rotating grill 51 in response to rotation of wheel 103, in accordance with the principle of the invention. Wheel 103 is mounted at a location such that the protuberances formed by outer ends 123 of spokes 120 of wheel 103 interact with protuberances 110 formed in grill 50 of grill carousel forming a meshing interaction between the protuberances formed by outer ends 123 of spokes 120 and protuberances 110 formed in grill 50 of grill carousel 100 imparting rotation to grill 50 of grill carousel 100 in response to rotation of wheel 103.

In FIG. 7, grill carousel 100 is mounted atop grill 21 forming grill assembly 102, and wheel 103 is mounted to a spit 130 of a horizontal rotisserie 131 carried by grill box 40, which is used to impart rotation to wheel 103. Rotisserie 131 is entirely conventional and is carried by a support attached to grill box 40, which, in this embodiment, is a continuous sidewall 132 attached to grill box 40. Continuous sidewall 132 encircles grill assembly 102, and projects upwardly from grill box 40 and grill assembly 102 to a continuous upper edge 133 encircling an opening 134 through which food is conveyed relative to grill assembly 102.

Spit 130 is an elongate, steel rod having opposed ends 140 and 141. Spit 130 is inserted into and through opening 124 formed in hub 121 installing wheel 103 onto spit 103. If desired, wheel 103 may be formed with or coupled to spit 130 in other ways without departing from the invention. Spit 130 is suspended centrally above and across grill assembly 102, and wheel 103 carried by spit 130 is positioned on spit so as to be held alongside and above outer perimeter 55 of grill 51 of grill assembly 102 away from grilling area 56 as illustrated in FIG. 7 allowing the protuberances of spokes 120 formed by outer ends 123 of spokes 120 to interact with protuberances 110 formed in grill 51 of grill carousel to impart rotation to grill 51 in response to rotation of wheel 103, thereby forming a meshing engagement or interaction between the protuberances formed by outer ends 123 of spokes 120 of wheel 103 and protuberances 110 formed in grill 51 of grill carousel 100.

Continuous sidewall 132 is the support that supports spit 130. In this embodiment, end 140 of spit is positioned in a groove or slot 145 formed in continuous upper edge 133 at one side of continuous sidewall 132 and end 141 of spit is similarly positioned in a groove or slot (not shown) formed in continuous upper edge 133 at an opposing side of continuous sidewall 132. End 140 is formed with a handle 150 projecting outwardly and away from continuous sidewall 132 and grill box 40, and end 141 is operatively coupled to a motor 151 positioned on the outer side of continuous sidewall 132 and grill box 40. In cooking food placed on grill 51, activation of motor 151 is initiated to impart rotation to spit 130, which, in turn, imparts rotation to wheel 103 about its axis of rotation C, which is common to the axis of rotation of spit 130 in this example, thereby rotating grill 50 by way of the operative coupling between wheel 103 and grill 50 as explained above.

Motor 151 may be activated intermittently, such as through manual operation or automatically by programming motor 151, to periodically rotate grill 50 a specified degree in the cooking of food on grill 50. Alternatively, motor 151 may be activated and left on continuously to impart continuous rotation to grill 50 in the grilling of food on grill. Rather than using motor 151, if desired intermittent or continuous rotation of spit 130 to impart intermittent or continuous rotation to wheel 103 for, in turn, imparting intermittent or continuous rotation to grill 50 in the cooking of food may be carried out manually by taking up handle 150 by hand and rotating spit 130 intermittently or continuously as may be desired.

The invention has been described above with reference to preferred embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A grill assembly, comprising:
   a flat, broad first grill having a first upper grill face to receive food to be cooked and an opposed lower grill face;
   a flat, broad second grill having a second upper grill face to receive food to be cooked, and an opposed second lower grill face;
   the second grill positioned atop the first upper grill face of the first grill juxtaposing the second lower grill face of the second grill opposite to the first upper grill face of the first grill;
   a coupling formed between the first grill and the second grill to allow rotation of the second grill relative to the first grill; and
   the coupling comprises a foot received against the first upper grill face of the first grill mounted to the second grill for rotation to allow rotation of the second grill relative to the first grill.

2. A grill assembly according to claim 1, further comprising:
   the first upper grill face of the first grill defining a first grilling area;
   the second upper grill face of the second grill defining a second grilling area; and
   the first grilling area of the first upper grill face of the first grill being greater than the second grilling area of the second upper grill face of the second grill.

3. A grill assembly according to claim 1, further comprising:
   the second grill further including an outer perimeter; and
   a plurality of protuberances formed at spaced intervals along the outer perimeter of the second grill extending upright relative to the second upper grill face of the second grill.

4. A grill assembly according to claim 1, further comprising the second grill further including an outer perimeter formed with opposed handles projecting upright relative to the second upper grill face of the second grill.

5. A grill assembly according to claim 1, further comprising the foot formed with at least one leg interacting with the first grill preventing the foot from rotating relative to the first grill in response to rotation of the second grill.

6. A grill assembly according to claim 1, wherein the second grill has a geometric center, and the foot is formed proximate to the geometric center of the second grill.

7. A grill assembly according to claim 1, further comprising:
   a grill box; and
   the grill assembly carried by the grill box.

8. A grill assembly according to claim 7, further comprising the grill box formed in a wheeled cart.

9. A grill assembly, comprising:
   a flat, broad first grill having a first upper grill face to receive food to be cooked and an opposed lower grill face;
   a flat, broad second grill having a second upper grill face to receive food to be cooked, and an opposed second lower grill face;
   the second grill positioned atop the first upper grill face of the first grill juxtaposing the second lower grill face of the second grill opposite to the first upper grill face of the first grill;
   a coupling formed between the first grill and the second grill to allow rotation of the second grill relative to the first grill;
   a wheel mounted for rotation adjacent to the second grill, the wheel operatively coupled to the second grill rotating the second grill in response to rotation of the wheel; and
   a handle operatively coupled to the wheel to impart rotation to the wheel in response to rotation of the handle.

10. A grill assembly according to claim 9, further comprising a motor operatively coupled to the wheel to impart rotation to the wheel.

11. A grill assembly according to claim 9, further comprising:
    the second grill further including an outer perimeter;
    a first plurality of protuberances formed at spaced intervals along the outer perimeter of the second grill; and
    a second plurality of protuberances carried by the wheel interacting with the first plurality of protuberances operatively coupling the wheel to the second grill.

12. A grill assembly according to claim 9, further comprising:
    the first upper grill face of the first grill defining a first grilling area;
    the second upper grill face of the second grill defining a second grilling area; and
    the first grilling area of the first upper grill face of the first grill being greater than the second grilling area of the second upper grill face of the second grill.

13. A grill assembly according to claim 9, further comprising the second grill further including an outer perimeter formed with opposed handles projecting upright relative to the second upper grill face of the second grill.

14. A grill assembly according to claim 9, wherein the coupling formed between the first grill and the second grill to allow rotation of the second grill relative to the first grill comprises a foot received against the first upper grill face of the first grill mounted to the second grill for rotation to allow rotation of the second grill relative to the first grill.

15. A grill assembly according to claim 14, further comprising the foot formed with at least one leg interacting with the first grill preventing the foot from rotating relative to the first grill in response to rotation of the second grill.

16. A grill assembly according to claim 15, wherein the second grill has a geometric center, and the foot is formed proximate to the geometric center of the second grill.

17. A grill assembly according to claim 9, further comprising:
    a grill box;
    the grill assembly and the wheel carried by the grill box.

18. A grill assembly according to claim 17, further comprising the grill box formed in a wheeled cart.

19. A grill assembly, comprising:
    a flat, broad first grill having a first upper grill face to receive food to be cooked and an opposed lower grill face;
    a flat, broad second grill having a second upper grill face to receive food to be cooked, and an opposed second lower grill face;
    the second grill positioned atop the first upper grill face of the first grill juxtaposing the second lower grill face of the second grill opposite to the first upper grill face of the first grill;

a coupling formed between the first grill and the second grill to allow rotation of the second grill relative to the first grill;

a wheel mounted for rotation adjacent to the second grill, the wheel operatively coupled to the second grill rotating the second grill in response to rotation of the wheel;

the second grill further including an outer perimeter;

a first plurality of protuberances formed at spaced intervals along the outer perimeter of the second grill; and a second plurality of protuberances carried by the wheel interacting with the first plurality of protuberances operatively coupling the wheel to the second grill.

20. A grill assembly, comprising:

a flat, broad first grill having a first upper grill face to receive food to be cooked and an opposed lower grill face;

a flat, broad second grill having a second upper grill face to receive food to be cooked, and an opposed second lower grill face;

the second grill positioned atop the first upper grill face of the first grill juxtaposing the second lower grill face of the second grill opposite to the first upper grill face of the first grill;

a coupling formed between the first grill and the second grill to allow rotation of the second grill relative to the first grill;

a wheel mounted for rotation adjacent to the second grill, the wheel operatively coupled to the second grill rotating the second grill in response to rotation of the wheel; and the coupling comprises a foot received against the first upper grill face of the first grill mounted to the second grill for rotation to allow rotation of the second grill relative to the first grill.

21. A grill assembly according to claim 20, further comprising the foot formed with at least one leg interacting with the first grill preventing the foot from rotating relative to the first grill in response to rotation of the second grill.

22. A grill assembly according to claim 20, wherein the second grill has a geometric center, and the foot is formed proximate to the geometric center of the second grill.

* * * * *